US 9,438,027 B2

(12) United States Patent
Turner et al.

(10) Patent No.: US 9,438,027 B2
(45) Date of Patent: Sep. 6, 2016

(54) SYSTEMS AND METHODS FOR POWER INTERRUPTION

(71) Applicant: General Electric Company, Schenectady, NY (US)

(72) Inventors: Gary Jay Turner, Rockwall, TX (US); Darwin Drake Smith, Rowlett, TX (US); Tab O. Walter, Plano, TX (US)

(73) Assignee: General Electric Company, Schenectady, NY (US)

( * ) Notice: Subject to any disclaimer, the term of this patent is extended or adjusted under 35 U.S.C. 154(b) by 190 days.

(21) Appl. No.: 13/836,841

(22) Filed: Mar. 15, 2013

(65) Prior Publication Data

US 2014/0268454 A1 Sep. 18, 2014

(51) Int. Cl.
*G01R 31/327* (2006.01)
*H02H 3/08* (2006.01)
*H02H 3/20* (2006.01)
*H02H 3/42* (2006.01)

(52) U.S. Cl.
CPC *H02H 3/20* (2013.01); *H02H 3/42* (2013.01)

(58) Field of Classification Search
CPC ...... G01R 31/3272; H02H 3/08; H02H 3/20; H02H 3/42
USPC .......................................................... 361/79
See application file for complete search history.

(56) References Cited

U.S. PATENT DOCUMENTS

| 4,827,369 | A | 5/1989 | Saletta et al. | |
|---|---|---|---|---|
| 5,684,377 | A * | 11/1997 | Kim et al. | 318/799 |
| 5,764,023 | A | 6/1998 | Wieloch | |
| 5,999,094 | A | 12/1999 | Nilssen | |
| 6,111,767 | A * | 8/2000 | Handleman | 363/95 |
| 6,807,035 | B1 | 10/2004 | Baldwin et al. | |
| 6,807,036 | B2 | 10/2004 | Baldwin | |
| 7,733,617 | B2 | 6/2010 | Baldwin et al. | |
| 7,800,874 | B2 | 9/2010 | DiSalvo et al. | |
| 7,916,437 | B2 | 3/2011 | Hardesty et al. | |
| 8,218,274 | B2 | 7/2012 | Hastings et al. | |
| 2012/0292991 | A1 | 11/2012 | Dodal et al. | |
| 2012/0293017 | A1* | 11/2012 | Lidsky et al. | 307/126 |

FOREIGN PATENT DOCUMENTS

| DE | WO 2013020698 A1 * | 2/2013 | G01R 1/203 |
|---|---|---|---|
| WO | 2005084197 A2 | 9/2005 | |

OTHER PUBLICATIONS

Raspotnig, "Designing NEC Class 2 Circuits With The PISA11 Protection Module", Pulspower, Nov. 2011, 2 pages.
Alpha Technologies Ltd., "eLimiter 100VA Power Limited Distribution System", Apr. 2012, 2 pages, Canada.
Emphatec, "INSTALINK™—SSR DC SSR & Current Limiter", Undated, 4 pages, Canada.

\* cited by examiner

*Primary Examiner* — Thienvu Tran
*Assistant Examiner* — Kevin J Comber
(74) *Attorney, Agent, or Firm* — General Electric Company

(57) ABSTRACT

A power interruption circuit for use in a power distribution module is provided. The power interruption circuit is configured to provide power to a load and includes a shunt resistor, a plurality of switches, and microprocessor. The microprocessor is configured to determine a digitized value of a current flowing through the shunt resistor, determine a digitized value of an output voltage of the power interruption circuit, calculate, from the digitized current value and the digitized output voltage value, a power provided by the power interruption circuit to the load, compare the calculated power to a threshold power level, and control the plurality of switches based on the comparison.

14 Claims, 4 Drawing Sheets

SYSTEMS AND METHODS FOR POWER INTERRUPTION

BACKGROUND

The field of the embodiments described herein relates generally to power distribution, and more particularly, to controlling an amount of power delivered to at least one load.

At least some power distribution systems include one or more power distribution modules that deliver power to a plurality of loads. These power distribution systems may be used to deliver power to devices for a variety of applications, including low-voltage lighting, thermostats, security systems, and limited energy voice, intercom, sound, public address, and communications systems. To protect the loads from overcurrent situations, the amount of power delivered by a power distribution module may be limited using a circuit breaker, a fuse, a trip mechanism, and/or another power interruption device.

At least some power distribution modules determine whether to interrupt (i.e., stop) power from being provided to a load without calculating a power value. For example, at least some power distribution modules monitor an analog current value to determine whether to interrupt power from being provided to a load. Further, at least some power distribution modules monitor an analog voltage value to determine whether to interrupt the provision of power.

BRIEF DESCRIPTION

In one aspect, a power interruption circuit for use in a power distribution module is provided. The power interruption circuit is configured to provide power to a load and includes a shunt resistor, a plurality of switches, and microprocessor. The microprocessor is configured to determine a digitized value of a current flowing through the shunt resistor, determine a digitized value of an output voltage of the power interruption circuit, calculate, from the digitized current value and the digitized output voltage value, a power provided by the power interruption circuit to the load, compare the calculated power to a threshold power level, and control the plurality of switches based on the comparison.

In another aspect, a power distribution module for use in a power distribution system is provided. The power distribution module includes a plurality of power interruption circuits, wherein each of the plurality of power interruption circuits is configured to provide power to a respective load, each of the plurality of power interruption circuits includes a shunt resistor, a plurality of switches, and a microprocessor. The microprocessor is configured to determine a digitized value of a current flowing through the shunt resistor, determine a digitized value of an output voltage of the power interruption circuit, calculate, from the digitized current value and the digitized output voltage value, a power provided by the power interruption circuit to the respective load, compare the calculated power to a threshold power level, and control the plurality of switches based on the comparison.

In yet another aspect, a method for controlling power supplied to a load through a current interruption circuit is provided. The method includes determining, using a processing device, a digitized value of a current flowing through a shunt resistor in the current interruption circuit, determining, using the processing device, a digitized value of an output voltage of the current interruption circuit, calculating, using the processing device, a power provided by the current interruption circuit to the load, the power calculated from the digitized current value and the digitized output voltage value, comparing the calculated power to a threshold power level, and controlling at least one switch in the power interruption circuit based on the comparison.

DETAILED DESCRIPTION

Exemplary systems and methods for controlling power distribution to a load are described herein. A power interruption circuit includes a microprocessor that calculates a power provided based on a digitized value of a current through a shunt resistor and a digitized value of an output voltage of the power interruption circuit. The microprocessor compares the calculated power to a threshold power level and controls one or more switches in the power interruption circuit based on the comparison.

Technical effects of the methods and systems described herein include at least one of: (a) determining a digitized value of a current flowing through a shunt resistor in a current interruption circuit; (b) determining a digitized value of an output voltage of the current interruption circuit; (c) calculating, a power provided by the current interruption circuit to the load; (d) comparing the calculated power to a threshold power level; and (e) controlling at least one switch in the power interruption circuit based on the comparison.

Figure 1:
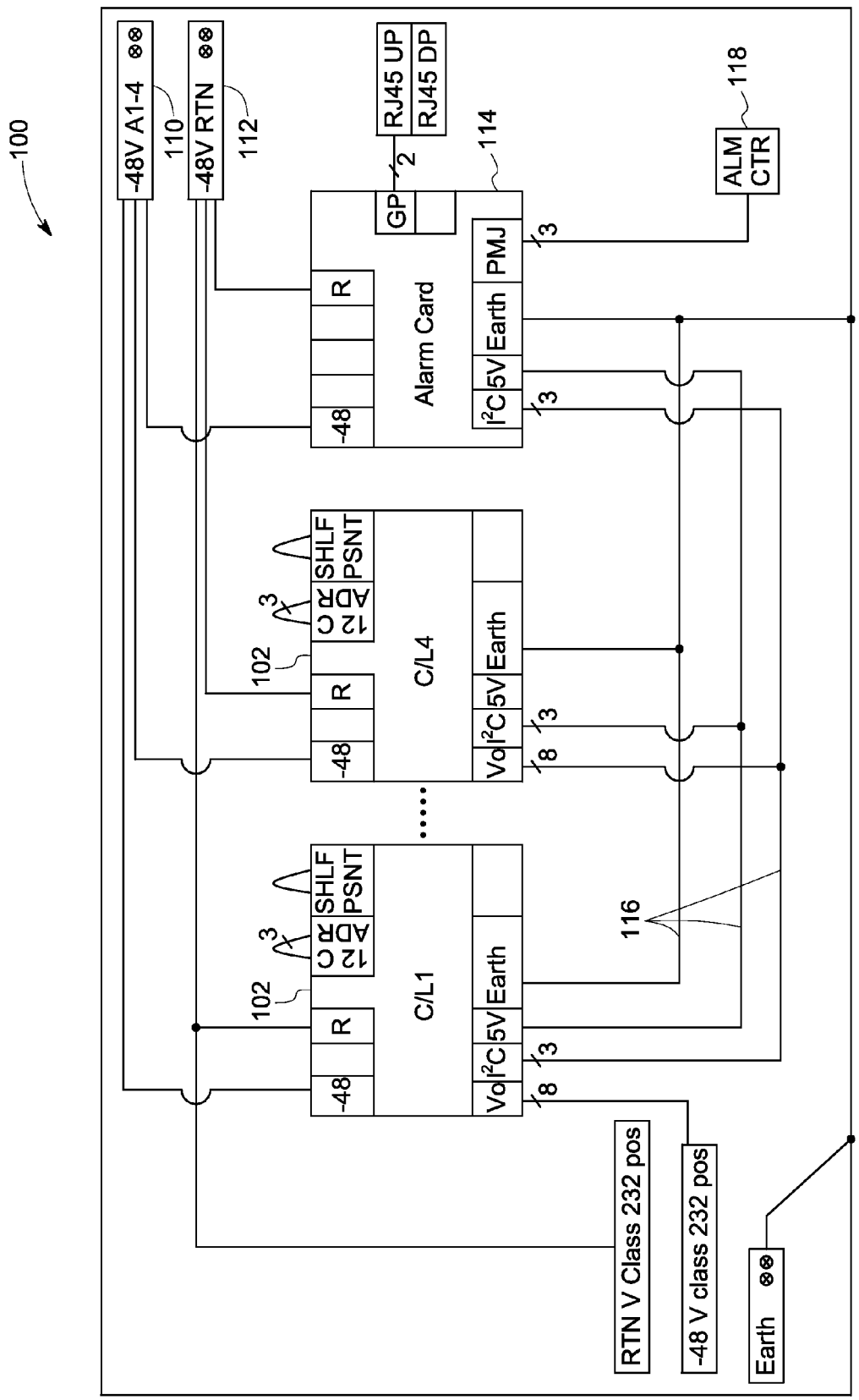
FIG. 1 is a schematic diagram of an exemplary power distribution system.

FIG. 1 is a schematic diagram of an exemplary power distribution system 100 that includes a plurality of power distribution modules 102.

Figure 2:
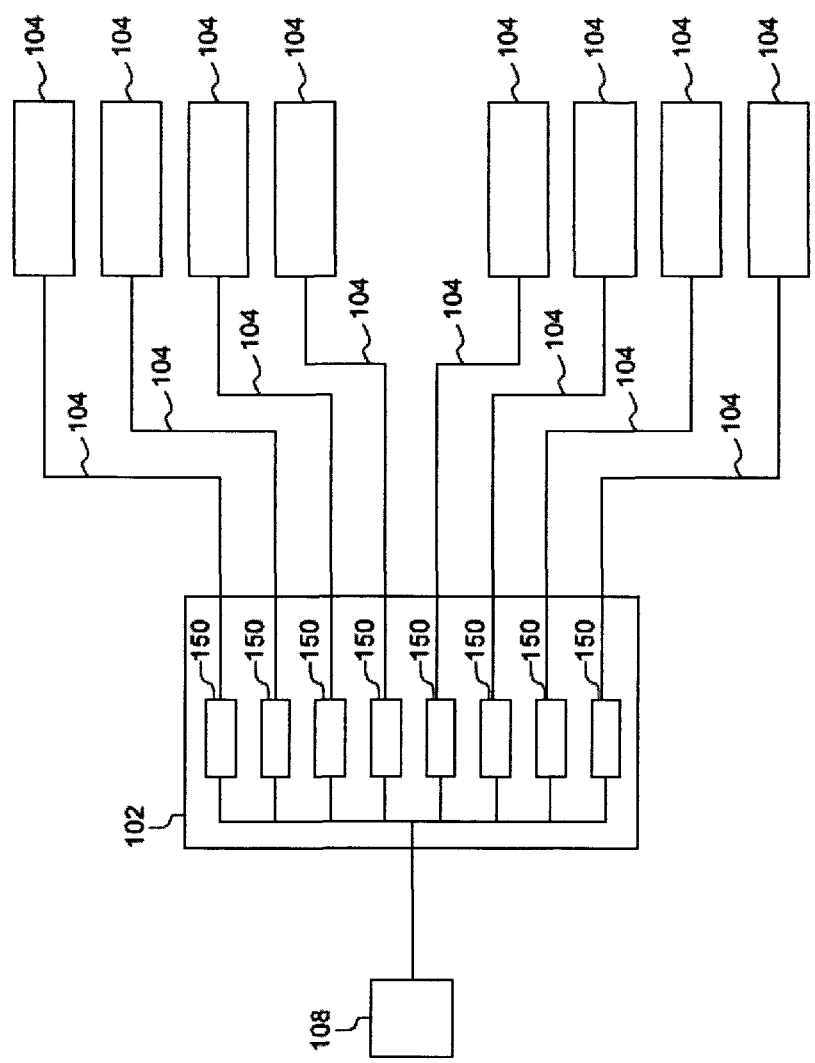
FIG. 2 is a block diagram of a portion of the power distribution system shown in FIG. 1.

FIG. 2 is a block diagram of a portion of power distribution system 100. In the exemplary embodiment, power distribution system 100 includes four power distribution modules 102. Alternatively, power distribution system 100 may include any number of power distribution modules 102 that enables power distribution system 100 to function as described herein.

As shown in FIG. 2, each power distribution module 102 distributes power to a plurality of loads 104. In the exemplary embodiment, each power distribution module 102 is coupled to, and distributes power to eight loads 104. Alternatively, each power distribution module 102 may distribute power to any number of loads 104 that enables power distribution module 102 to function as described herein. Loads 104 may be any electrical device and/or grid capable of receiving power from power distribution modules 102. For example, in one embodiment, each load 104 is a telecommunications antenna that forms part of a cellular network. In the exemplary embodiment, power distribution devices 102 are arranged on a shelf and/or rack.

Each power distribution module 102 receives power from a power supply 108. In the exemplary embodiment, power supply 108 includes a negative power input 110 and a positive power input 112 that provide power at an input voltage of 48 Volts. An alarm card 114 is coupled to power distribution modules 102 via a plurality of backplane serial buses 116, and an alarm controller 118 coupled to alarm card 114 monitors the operation of alarm card 114. Alarm card 114 and/or alarm controller 118 may generate an alarm if failure of one or more power distribution modules 102 is detected. In at least some embodiments, the operation of each power distribution module 102 is monitored independently by a separate remote supervision controller (not shown).

Each power distribution module 102 includes a plurality of power interruption circuits 150 that each control power distribution to a respective load 104. In the exemplary embodiment, power distribution module 102 is a Class 2 device. Accordingly, to protect downstream circuits (e.g., loads 104), power distribution module 102 is rated to provide a maximum power output of 100 Volt-amperes (VA) to each load 104. In the event that more than 100VA is drawn by a particular load 104, the associated power interruption circuit 150 interrupts distribution of power to that load 104, as described in detail below.

Figure 3:
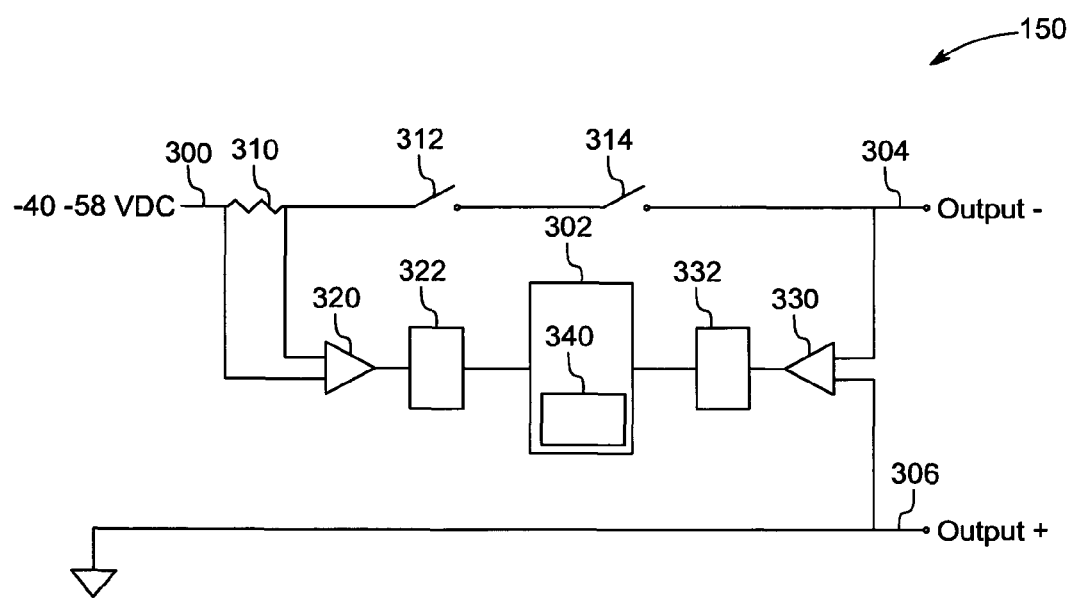
FIG. 3 is a circuit diagram of an exemplary power interruption circuit that may be used with the power distribution module shown in FIGS. 1 and 2.

FIG. 3 is a circuit diagram of an exemplary power interruption circuit 150 that may be used in power distribution modules 102 (shown in FIGS. 1 and 2). Power interruption circuit 150 includes a microprocessor 302 that calculates the power provided through power interruption circuit 150 in a digital form.

Power interruption circuit 150 includes a voltage input 300 from power supply 108 (shown in FIG. 2), and a negative voltage output 304 and a positive voltage output 306 that provide power to load 104 (shown in FIG. 2). Power interruption circuit 150 further includes a shunt resistor 310, a first switch 312, and a second switch 314. Microprocessor 302 calculates the power provided through power interruption circuit 150 based on a current flowing through shunt resistor 310 and an output voltage across voltage outputs 304 and 306. Specifically, the power provided through power interruption circuit 150 is equal to the current flowing through shunt resistor 310 multiplied by the output voltage across voltage outputs 304 and 306 (i.e., P=I*V).

In the exemplary embodiment, shunt resistor 310 is coupled in series with first and second switches 312 and 314. Alternatively, shunt resistor 310 may be coupled in any configuration with first and second switches 312 and 314 that enables power interruption circuit 150 to function as described herein. For example, in one alternative embodiment, first and second switches 312 and 314 are coupled in series, and shunt resistor 310 is coupled in parallel with one of first and second switches 312 and 314. In another alternative embodiment, shunt resistor 310 and one of first and second switches 312 and 314 are coupled in series with each other, but coupled in parallel with the other of first and second switches 312 and 314. Moreover, to calculate the power provided through power interruption circuit 150, current can be measured at any point that lies along a path in series with the location of shunt resistor 310 as shown in FIG. 3.

In the exemplary embodiment, first and second switches 312 and 314 are power semiconductor (e.g., MOSFET) switches. Alternatively, first and second switches 312 may be any switching devices that enable power interruption circuit 150 to function as described herein. Further, although two switches are included in the exemplary embodiment to provide redundancy, power interruption circuit 150 may include any number of switches that enables power interruption circuit 150 to function as described herein. For clarity, first and second switches 312 and 314 are shown in an open position in FIG. 3. However, as will be appreciated by those of skill in the art, first and second switches 312 and 314 are in a closed position in a default state where power is being provided through power interruption circuit 150 to load 104. Load 104 may include any downstream powered equipment, circuit, and/or cabling coupled to power distribution module 102.

To determine the current through shunt resistor 310, a first amplifier 320 amplifies the voltage across shunt resistor 310. In the exemplary embodiment, first amplifier 320 has a gain of 12. Alternatively, first amplifier 320 may have any gain that enables power interruption circuit 150 to function as described herein. The output of first amplifier 320 is digitized using a first analog to digital converter (ADC) 322, which in turn provides a digitized value of the voltage across shunt resistor 310 to microprocessor 302.

A second amplifier 330 divides down the output voltage across voltage outputs 304 and 306. In the exemplary embodiment, second amplifier 330 has a gain of 0.03. Alternatively, second amplifier 330 has any gain that enables power interruption circuit 150 to function as described herein. The output of second amplifier 330 is digitized using a second ADC 332, which in turn provides a digitized value of the output voltage across voltage outputs 304 and 306 to microprocessor 302.

Microprocessor 302 includes at least one memory device 340 in the exemplary embodiment. In some embodiments, executable instructions are stored in memory device 340. In the exemplary embodiment, microprocessor 302 is programmed by encoding an operation as one or more executable instructions and by providing the executable instructions in memory device 340.

Microprocessor 302 may include one or more processing units (e.g., in a multi-core configuration). Further, microprocessor 302 may be implemented using one or more heterogeneous processor systems in which a main processor is present with secondary processors on a single chip. As another illustrative example, microprocessor 302 may be a symmetric multi-processor system containing multiple processors of the same type. Further, microprocessor 302 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, microprocessor 302 performs various calculations and controls operation of first and second switches 312 and 314 as described herein.

In the exemplary embodiment, memory device 340 is one or more devices that enable information such as executable instructions and/or other data to be stored and retrieved. Memory device 340 may include one or more computer readable media, such as, without limitation, dynamic random access memory (DRAM), static random access memory (SRAM), a solid state disk, and/or a hard disk. Memory device 340 may be configured to store, without limitation, application source code, application object code, source code portions of interest, object code portions of interest, configuration data, execution events and/or any other type of data. In the exemplary embodiment, memory device 340 includes firmware and/or initial configuration data for microprocessor 302.

In the exemplary embodiment, microprocessor 302 receives a digitized value of the voltage across shunt resistor 310 and a digitized value of the voltage across voltage outputs 304 and 306. Microprocessor 302 calculates the current through shunt resistor using I=Vr/R, where Vr is the digitized voltage across shunt resistor 310 and R is the resistance of shunt resistor 310. The resistance R may be stored, for example, in memory device 340.

Microprocessor 302 calculates the power supplied to load 104 through power interruption circuit 150 as P=I*Vo, where I is the digitized value of the current through shunt resistor 310, and Vo is the digitized value of the voltage across voltage outputs 304 and 306. Microprocessor 302 compares the calculated power P to a threshold power level. The threshold power level may be stored, for example, in memory device 340. If the calculated power P is less than or equal to the threshold power level, first and second switches 312 and 314 remain in the closed position, and power continues to be provided to load 104. If the calculated power P is above the threshold power level, microprocessor 302 transmits an open signal to first and second switches 312 and 314 that instructs first and second switches 312 and 314 to switch from the closed position to the open position, interrupting the supply of power to load 104. In the exemplary embodiment, switches 312 and 314 provide redundancy. That is, if one of first and second switches 312 and 314 fails to open in response to the open signal transmitted by microprocessor 302, the other one of first and second switches 312 and 314 will still open, successfully interrupting the supply of power to load 104.

In the exemplary embodiment, the threshold power level is 100VA. Alternatively, the threshold power level may be any power level that enables power interruption circuit to function as described herein. For example, in one embodiment, the threshold power level may be set slightly below 100VA (e.g., 98VA) to provide a buffer that ensures the supplied power does exceed 100VA.

In some embodiments, microprocessor 302 may perform other calculations and/or functions related to the operation of power interruption circuit 150. For example, the actual resistance of shunt resistor 310 may be temperature dependent. Accordingly, in one embodiment, microprocessor 302 dynamically calculates the resistance R based on a temperature of shunt resistor 310. The temperature of shunt resistor 310 may be detected using, for example, a temperature sensor (not shown) communicatively coupled to microprocessor 302.

Further, in some embodiments, data related to operation of power interruption circuit 150 may be stored on memory device 340. For example, the calculated power, the digitized value of current through shunt resistor 310, and/or the digitized value of the output voltage across voltage outputs 304 and 306 can be stored and tracked over time. Statistics, calibration information, error correction information, and/or any other useful data may be generated from these or other values. Moreover, in some embodiments, data related to the operation of power interruption circuit 150 may be transmitted to a controller (not shown) that is remote from power distribution module 102. Further, in some embodiments, error corrections may be performed by microprocessor 302 to adjust the calculated power value for ambient temperature effects, aging, high current versus low current during operation, etc. This information may be taken into account as factory settings (e.g., stored in a lookup table) or performed during calibration.

Figure 4:
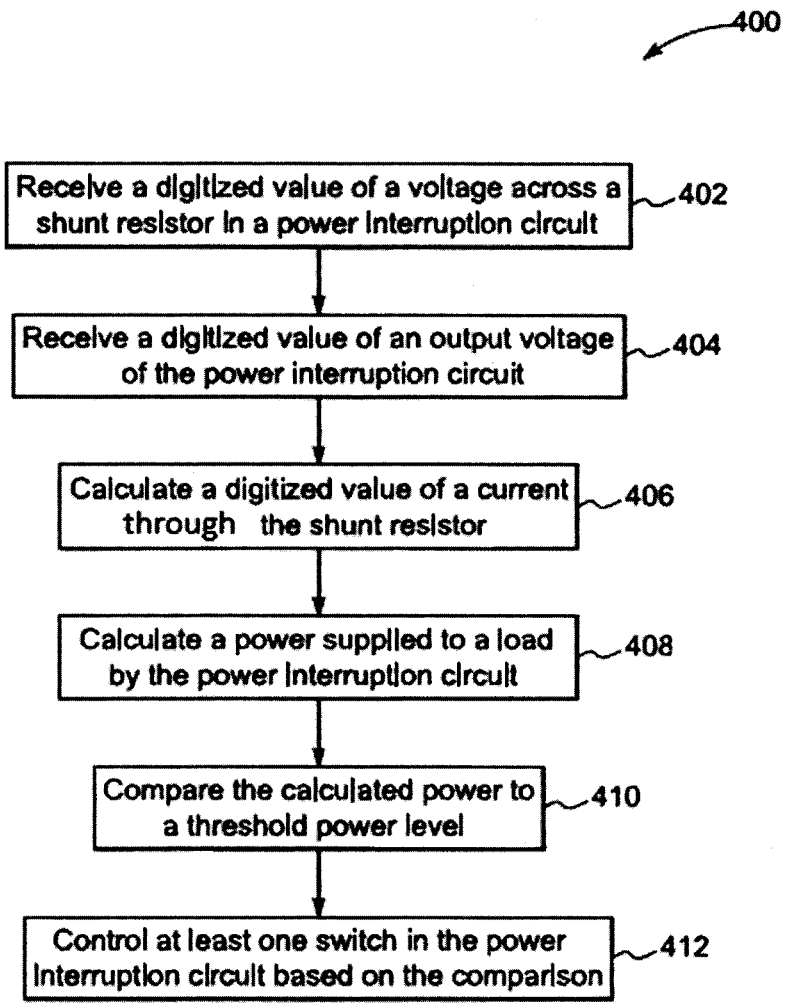
FIG. 4 is a flowchart of an exemplary method for controlling power distribution to a load.

FIG. 4 is a flowchart of an exemplary method 400 for controlling power distribution to a load, such as load 104 (shown in FIG. 2). A processing device, such as microprocessor 302 (shown in FIG. 3), receives 402 a digitized value of a voltage across a shunt resistor of a power interruption circuit, such as shunt resistor 310 of power interruption circuit 150 (both shown in FIG. 3). The processing device also receives 404 a digitized value of an output voltage of the power interruption circuit.

The processing device calculates 406 a digitized value of the current through the shunt resistor from the digitized value of the voltage across the shunt resistor. From the digitized value of the current through the shunt resistor and the digitized value of the output voltage, the processing device calculates 408 power supplied to the load. The calculated power is compared 410 to a threshold power level. Based on the comparison, the processing device controls 412 at least one switch in the power interruption circuit, such as first and second switches 312 and 314 (shown in FIG. 3). In the exemplary embodiment, when the calculated power is below or equal to the threshold power level, at least one switch remains in a closed position, and when the calculated power is greater than the threshold power level, at least one switch switches from a closed position to an open position, interrupting power supplied by the power interruption circuit.

Exemplary embodiments for controlling power distribution to a load are described herein. A power interruption circuit includes a microprocessor that calculates a power provided based on a digitized value of a current through a shunt resistor and a digitized value of an output voltage of the power interruption circuit. The microprocessor compares the calculated power to a threshold power level and controls one or more switches in the power interruption circuit based on the comparison.

As compared to at least some known power distribution modules, the systems and methods described herein facilitate digitally calculating a power provided to a load using a microprocessor. By calculating a power provided to a load in accordance with the systems and methods described herein, the microcontroller can quickly determine whether an excess amount of power is being provided and interrupt the power supplied to the load by opening one or more switches.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power interruption circuit for use in a power distribution module, said power interruption circuit configured to provide direct current (DC) power to a load and comprising:
a shunt resistor;
a plurality of switches;
a microprocessor configured to:
calculate a resistance of said shunt resistor based on a measured temperature of said shunt resistor;
determine a digitized value of a current flowing through said shunt resistor;
determine a digitized value of a DC output voltage of said power interruption circuit;
calculate, from the digitized current value and the digitized output voltage value, a power provided by said power interruption circuit to the load;
adjust the calculated power to correct errors determined based on a measured ambient temperature;
compare the calculated power to a threshold power level; and
control said plurality of switches based on the comparison;
an amplifier configured to amplify a DC voltage across said shunt resistor; and
an analog to digital converter configured to convert the amplified voltage into a digitized shunt voltage value, wherein said microprocessor is further configured to:
determine the digitized value of the current based on the digitized shunt voltage value and the calculated resistance.

2. A power interruption circuit in accordance with claim 1, wherein said shunt resistor is coupled in series with at least one of said plurality of switches.

3. A power interruption circuit in accordance with claim 1, wherein said plurality of switches comprises two switches.

4. A power interruption circuit in accordance with claim 1, wherein to control said plurality of switches based on the comparison, said microprocessor is configured to:
maintain said plurality of switches in a closed position when the calculated power is less than or equal to the threshold power level; and
switch said plurality of switches from the closed position to an open position when the calculated power is greater than the threshold power level.

5. A power interruption circuit in accordance with claim 1, wherein the threshold power level is 100 Volt-amperes (VA).

6. A power distribution module for use in a power distribution system, said power distribution module comprising:
a plurality of power interruption circuits, wherein each of said plurality of power interruption circuits is configured to provide direct current (DC) power to a respective load, each of said plurality of power interruption circuits comprising:
a shunt resistor;
a plurality of switches;
an amplifier configured to amplify a DC voltage across said shunt resistor;
an analog to digital converter configured to convert the amplified voltage into a digitized shunt voltage value; and
a microprocessor configured to:
calculate a resistance of said shunt resistor based on a measured temperature of said shunt resistor;
determine a digitized value of a current flowing through said shunt resistor based on the digitized shunt voltage value and the calculated resistance;
determine a digitized value of a DC output voltage of said power interruption circuit;
calculate, from the digitized current value and the digitized output voltage value, a power provided by said power interruption circuit to the respective load;
adjust the calculated power to correct errors determined based on an age of said power distribution module;
compare the calculated power to a threshold power level; and
control said plurality of switches based on the comparison.

7. A power distribution module in accordance with claim 6, wherein said shunt resistor is coupled in series with at least one of said plurality of switches.

8. A power distribution module in accordance with claim 6, wherein said plurality of switches comprises two switches.

9. A power distribution module in accordance with claim 6, wherein to control said plurality of switches based on the comparison, said microprocessor is configured to:
maintain said plurality of switches in a closed position when the calculated power is less than or equal to the threshold power level; and
switch said plurality of switches from the closed position to an open position when the calculated power is greater than the threshold power level.

10. A power distribution module in accordance with claim 6, wherein said plurality of power interruption circuits comprises eight power interruption circuits.

11. A method for controlling direct current (DC) power supplied to a load through a current interruption circuit, said method comprising:
determining, using a processing device, a digitized value of a current flowing through a shunt resistor in the current interruption circuit, the determining comprising:
amplifying a DC shunt voltage across the shunt resistor; and
converting the DC shunt voltage into a digitized value of the DC shunt voltage;
calculating a resistance of the shunt resistor based on a measured temperature of the shunt resistor; and
determining the digitized value of the current based on the digitized DC shunt voltage value and the calculated resistance;
calculating, using the processing device, a DC power provided by the current interruption circuit to the load, the power calculated from the digitized current value and the digitized output voltage value;
adjusting the calculated DC power to correct errors determined based on an age of the power distribution module;
comparing the calculated DC power to a threshold power level; and
controlling at least one switch in the current interruption circuit based on the comparison.

12. A method in accordance with claim 11, wherein controlling at least one switch in the current interruption circuit based on the comparison comprises:
maintaining the at least one switch in a closed position when the calculated power is less than or equal to the threshold power level; and switching the at least one switch from the closed position to an open position when the calculated power is greater than the threshold power level.

13. A method in accordance with claim 11, wherein comparing the calculated power to a threshold power level comprises comparing the calculated power to a threshold power level of 100 Volt-amperes (VA).

14. A method in accordance with claim 11, further comprising storing the calculated power on a memory device communicatively coupled to the processing device.

* * * * *